United States Patent [19]

Bluhm et al.

[11] Patent Number: 5,898,815
[45] Date of Patent: Apr. 27, 1999

[54] I/O BUS INTERFACE RECOVERY COUNTER DEPENDENT UPON MINIMUM BUS CLOCKS TO PREVENT OVERRUN AND RATIO OF EXECUTION CORE CLOCK FREQUENCY TO SYSTEM BUS CLOCK FREQUENCY

[75] Inventors: Mark W. Bluhm; Marvin W. Martinez, Jr., both of Plano, Tex.

[73] Assignee: National Semiconductor Corporation, Santa Clara, Calif.

[21] Appl. No.: 08/600,781

[22] Filed: Feb. 13, 1996

[51] Int. Cl.[6] ................................................. G06F 13/372
[52] U.S. Cl. .......................... 395/865; 395/880; 395/878
[58] Field of Search ..................................... 327/160, 166; 340/825.21; 364/136; 377/29; 395/182.13, 182.15, 282, 309, 855, 865, 880, 878

[56] References Cited

U.S. PATENT DOCUMENTS

| | | | |
|---|---|---|---|
| 3,700,821 | 10/1972 | Savage | 327/166 |
| 4,064,395 | 12/1977 | Schubeler et al. | 364/136 |
| 4,694,196 | 9/1987 | Hasley et al. | 307/269 |
| 4,703,481 | 10/1987 | Fremont | 395/182.15 |
| 4,740,969 | 4/1988 | Fremont | 395/182.13 |
| 5,065,313 | 11/1991 | Lunsford | 395/275 |
| 5,095,450 | 3/1992 | Shakra et al. | 395/114 |
| 5,195,110 | 3/1993 | Gorshe | 375/110 |
| 5,384,563 | 1/1995 | Massey | 340/825.21 |
| 5,448,699 | 9/1995 | Goss et al. | 395/282 |
| 5,473,651 | 12/1995 | Guzinski et al. | 377/29 |
| 5,603,041 | 2/1997 | Carpenter et al. | 395/309 |
| 5,634,139 | 5/1997 | Takita | 395/855 |

*Primary Examiner*—Thomas G. Lee
*Assistant Examiner*—Chien Yuan
*Attorney, Agent, or Firm*—John L. Maxin

[57] ABSTRACT

A bus interface unit of a processor comprises an I/O recovery counter for preventing peripheral overrun due to successive I/O bus cycles. The I/O recovery counter counts the necessary I/O recovery period between I/O bus cycles necessary to prevent peripheral overrun. The I/O recovery counter comprises a clock input from the processor and a signal derived from the bus control signal READY. The I/O recovery counter begins to count at the receipt of the READY signal after the initiation of an I/O bus cycle. The bus interface unit waits until the I/O recovery counter completes its count of the I/O recovery period prior to initiating another I/O bus cycle.

15 Claims, 3 Drawing Sheets

I/O BUS INTERFACE RECOVERY COUNTER DEPENDENT UPON MINIMUM BUS CLOCKS TO PREVENT OVERRUN AND RATIO OF EXECUTION CORE CLOCK FREQUENCY TO SYSTEM BUS CLOCK FREQUENCY

TECHNICAL FIELD OF THE INVENTION

This invention is in the field of integrated circuits, and is more particularly directed to an I/O recovery counter and method for use thereof in a bus interface unit of a microprocessor.

BACKGROUND OF THE INVENTION

A typical X86 family of processors communicates with off-chip memory and peripheral units such as a hard disk, keyboard, etc. through memory or I/O bus cycles. A memory bus cycle is used to fetch instructions and data from the system's memory or to write data to the system's memory. The memory may be on the system board, in ROM or RAM. The processor executes a memory instruction in response to, inter alia, a "mov" or "str" instruction. To execute a memory cycle, the processor asserts an M/IO# pin to a "1" and generates an address on address pins A31 through A3.

The I/O bus cycle is used to communicate with peripheral devices in the system such as a hard disk, keyboard, etc. An I/O cycle is initiated by the processor when it executes, inter alia, an IN instruction or an OUT instruction. To execute an I/O bus cycle, the processor sets the M/IO# pin to a "0" and generates an address on the address pins A3–A15. Each peripheral which communicates with the processor via an I/O bus cycle is assigned a portion of the 64 Kbytes address space provided by the address pins. The peripheral devices sense the address and determine when the address corresponds to its assigned address. A system bus controller attached to the system bus returns a READY signal to the processor in response to the initiation of a bus cycle when the address is latched.

In the prior art, the READY signal is used to create wait-states on the bus during an I/O bus cycle. For example, in the 8088 processor if the READY signal is held low until the rising edge of the next bus clock during an I/O bus cycle, a wait state is inserted. Thus, an I/O bus cycle of four clocks can be extended to five clocks. The READY signal can generate up to five wait states in any one I/O bus cycle. When the READY signal is again active, the I/O bus cycle ends. The bus cycle is normally four clocks in length or 1 microsecond for 4.77 MHz clock speed board designs, plus any additional wait states, for prior art systems.

When a system bus controller has control of the system bus, its timing signals are derived from the same clock signal that the processor uses. At higher processor speeds, the clock signal is doubled or tripled to produce the processor speed. All external parameters however are defined with respect to the clock signal's rising edge With the advent of super-scalar, super-pipelined processors, processors are running at increasing speeds of 100 Mhz and more. At higher processor speeds, the system clock signal is doubled or tripled to produce the processor speed. This increasing speed of instructions by processors creates problems when executing I/O bus cycles. For example, a processor may execute an OUT instruction in a first clock and a second OUT instruction in the second clock. However, a peripheral is not able to respond to I/O write instructions in quick succession even when wait states are inserted in the bus cycle. Thus, when two OUT instructions specifying the same peripheral occur in quick succession, the peripheral may be unable to accept the data at the rate the data is transmitted. The peripheral is thus overrun because it can not accept the second I/O bus cycle. Peripheral overrun may result in loss of data or system slowdown because the data must be resent. This time from a first I/O write cycle to a second I/O write cycle for an I/O device to capture the data correctly is known as the I/O recovery time.

In the prior art, several suggestions to provide adequate I/O recovery time have been made. First, if back to back OUT instructions occur in a processor, the prior art suggests inserting a jump to the next instruction. The jump requires the processor to perform the next instruction before performing the second I/O instruction and place the second OUT instruction in memory. The second OUT instruction must then be fetched from memory again. This delay imposed by the memory read to fetch the second OUT instruction acts as a recovery period between back to back OUT instructions. However, this prior art solution will not work with some x86 type processors, such as the 486, because the OUT instruction may be stored on the on-chip cache when a jump occurs. The time to fetch the OUT instruction from an on-chip cache is only one processor clock cycle and is usually not an adequate period of time for I/O recovery.

Another suggestion in the prior art is to explicitly generate a read cycle to a non-cacheable location in memory. This would guarantee that a read bus cycle is performed between the back to back OUT instructions. The time that elapses during the non-cacheable memory read bus cycle will give the I/O device time to recover before the next I/O write bus cycle begins on the external buses. However, the location of a non-cacheable memory and cacheable memory is a configuration specific to each system platform. Thus, a program using this solution may fail in some system configurations.

A third solution suggested in the prior art has been to perform a "dummy" I/O read from an I/O location that will not be affected by the read operation. This dummy I/O read placed in between the back to back I/O write cycles guarantees at least two processor clock cycles of delay between the two I/O write cycles. This dummy I/O read however still requires an interruption in the order of processor instructions. Further, all three prior art suggestions fail if the I/O recovery period required is longer than the time necessary to perform the inserted instruction. Thus, for instance, if the I/O recovery time is longer than the period to perform the "dummy" I/O read, than peripheral overrun may still occur.

It is thus an object of the present invention to provide an apparatus and method of operating the same in which successive I/O bus cycles occur without peripheral overrun.

It is a further object of the present invention to provide an apparatus and method of operating the same in which the I/O bus cycles are performed with little interference in bus traffic.

It is still a further object of the present invention to provide an apparatus and method of operating the same in which the processor instruction order is not disturbed when providing I/O recovery time.

Other objects and advantages of the present invention will be apparent to those of ordinary skill in the art having reference to the following specification.

SUMMARY OF THE INVENTION

The present invention comprises an I/O recovery counter with a processor clock signal input and a count signal input indicating an initiation of an I/O bus cycle on a system bus.

In response to the count signal, a counter counts to an I/O recovery count number corresponding to the minimum number of processor clocks needed for an adequate I/O recovery period. When the I/O recovery counter completes the count of the I/O recovery count number, it outputs a complete signal. The bus interface unit of the processor waits to initiate a subsequent I/O cycle until the I/O recovery counter outputs the complete signal.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE PREFERRED EMBODIMENT

Figure 1:
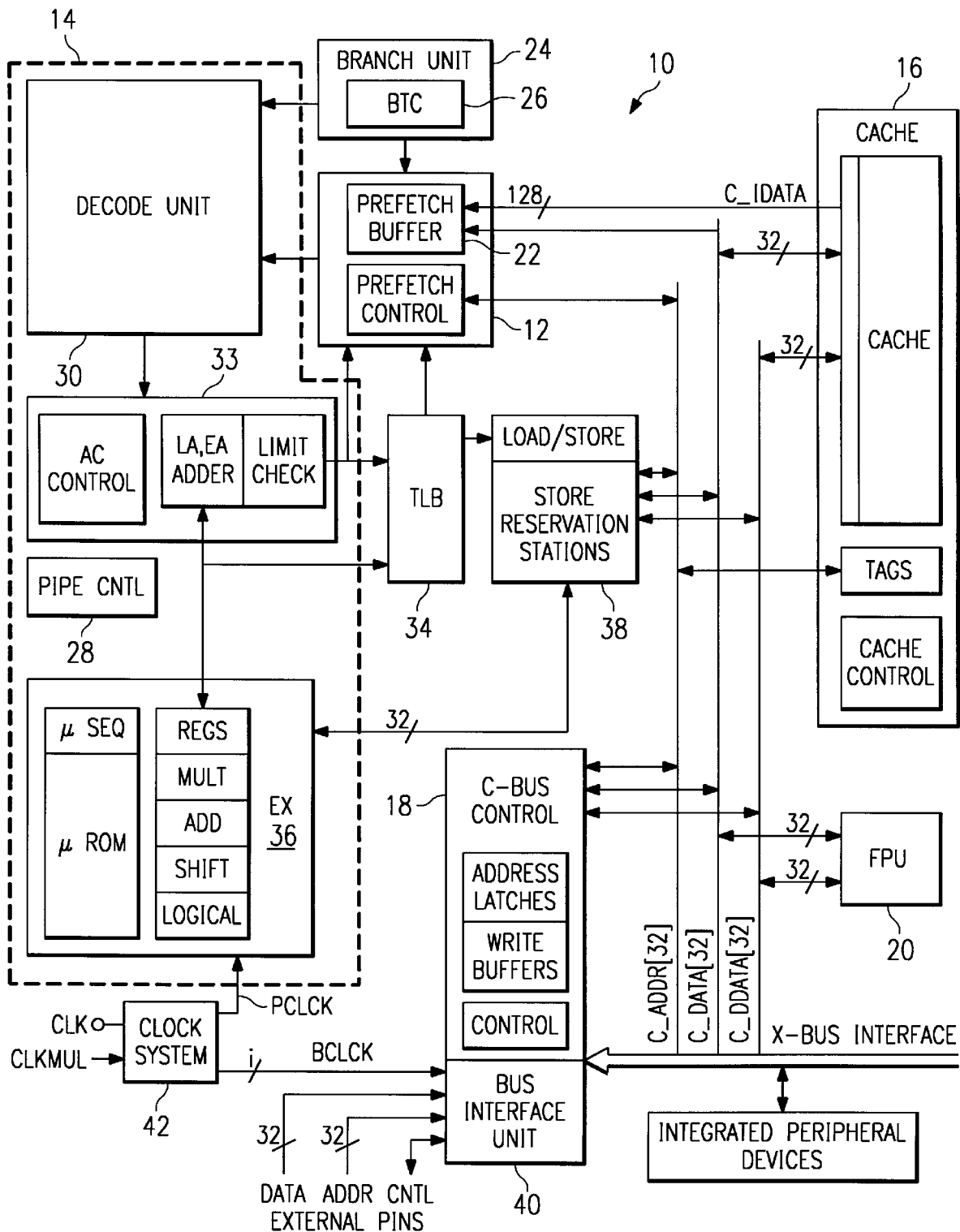
FIG. 1 illustrates an electrical schematic, in block form, of an exemplary microprocessor incorporating the preferred embodiment of the invention.

FIG. 1 illustrates an exemplary superpipelined processor 10, into which the preferred embodiment of the present invention may be implemented. Of course, the present invention may be applicable to other processors of differing architectures, that may benefit from the increased efficiency of I/O access cycles and other advantages of the present invention.

The processor uses a modular architecture in which an arbitrated C-bus interconnects a prefetch unit 12, an execution core 14, (L1) level one cache 16, bus controller 18, and floating point unit (FPU) 20.

Instruction fetch is performed by a prefetch unit 12, which fetches instruction bytes into a multi-block prefetch buffer 22. A branch unit 24 supplies prefetch addresses to the prefetch unit 12 for branches stored in a branch target cache (BTC) 26. The BTC 26 is accessed with the instruction pointer for the instruction prior to a branch.

An execution core 14 includes the ID, AC1/AC2, EX, and WB pipeline stages. A pipe control unit 28 controls the flow of instructions through the pipe stages of the execution core 14. Floating point instructions are executed in a floating point unit (FPU) 20.

A decode unit 30 decodes one x86 instruction per clock. Decoded instructions are dispatched to an AC unit 33, which is superpipelined into AC1 and AC2 pipe stages.

The AC unit 33 generates memory reference addresses for loading operands from memory (accessing the cache) or I/O units and storing execution results to memory (posting to a load/store unit). The AC1 stage calculates one linear address per clock (address calculations involving three components require an additional clock). The AC2 stage performs limit checking and, if paging is enabled, linear-to-physical address translation through a translation lookaside buffer (TLB) 34. The AC unit 33 issues instructions either to an EX unit 36 or to the FPU 20.

Integer instructions are issued to the EX unit 36 for execution. EX unit 36 receives source operands (a) as immediate data passed along with the instruction from the AC unit 33, (b) from the register file, and/or for memory references, and (c) from a load/store unit 38. Execution results are written back in the WB stage either to the register file or to the cache (memory) through load store reservation stations in the load store unit 38.

The load/store unit 38 performs load/store operations for the prefetch unit 12 and the execution core 14. Eight reservation station buffers are used for posting stores—stores can be posted conditionally pending resolution of a branch, retiring only if the branch resolves correctly. Stores are queued in program order—data loads from the AC2 stage may bypass pending stores, and will source out of the reservation stations in the case of a load/store address match.

The L1 cache 16 is a 16 K byte unified data/instruction cache, organized as 4 way set associative with 256 lines per set and 16 bytes (4 dwords) per cache line. The L1 cache 16 can be operated in either write-through or write-back mode—to support a write-back coherency protocol, each cache line includes 4 dirty bits (one per dword).

A bus interface unit (BIU) 40 interfaces to external 32 bit address and data buses (such as the 486-type bus), and to an external control bus. Alternatively, the BIU 40 can be modified to interface to an external 64-bit data bus (such as the Pentium-type bus). The BIU 40 interfaces to two internal buses, a C-bus and an X-bus, through the bus controller 18. The BIU 40 includes a buffer for storing subsequent I/O bus access cycles, as described in more detail hereinbelow. The BIU 40 receives address and control signals over the C-bus defining the address and control information for a bus cycle from the execution core 14.

The C-bus is an arbitrated bus that interconnects the prefetch unit 12, execution core 14, load/store unit 38, L1 cache 16, BIU 40, and the FPU 20. C-bus control is in the BIU 40. The C-bus includes a 32 bit address bus C_ADDR, two 32-bit data buses C_DATA and C_DDATA, and a 128-bit (16 byte cache line) dedicated instruction bus. C_DATA and C_DDATA can be controlled to provide for 64 bit transfers to the FPU 20, and to support interfacing the L1 cache 16 to a 64-bit external data bus. In general, for 32-bit data transfers, the C_DATA bus is used for data transfers between the BIU 40 and the L1 cache 16, and the C_DDATA bus is used for transfers between the load/store unit and the L1 cache 16. For instruction fetch misses, instruction data is provided over the C_DATA bus to the prefetch unit 12 at the same time it is provided to the L1 cache 16. The X-bus is an extension of the external bus interface that allows peripheral devices to be integrated on chip.

The timing operation of processor 10, is under the control of clock generator system 42, which generates internal clock signals for use throughout processor 10. In particular, these internal clock signals include bus clock signal BCLCK which is forwarded to BIU 40, and processor clock signal PCLCK which is forwarded to execution core 14. The clock generator system 42 is connected to an external clock terminal CLK, from which it receives either a periodic clock signal (e.g., from a crystal oscillator) or a logic level transition. A clock multiplier input CLKMUL is also connected to the clock generator system 42. CLKMUL is sampled during a reset of the processor, such as at power-up, to determine the execution core 14 operating frequency. If CLKMUL is zero or is left unconnected, the execution core 14 frequency is two times the frequency of the CLK input. If CLKMUL is a logical 1, then the execution core frequency is three times the frequency of CLK.

Figure 2:
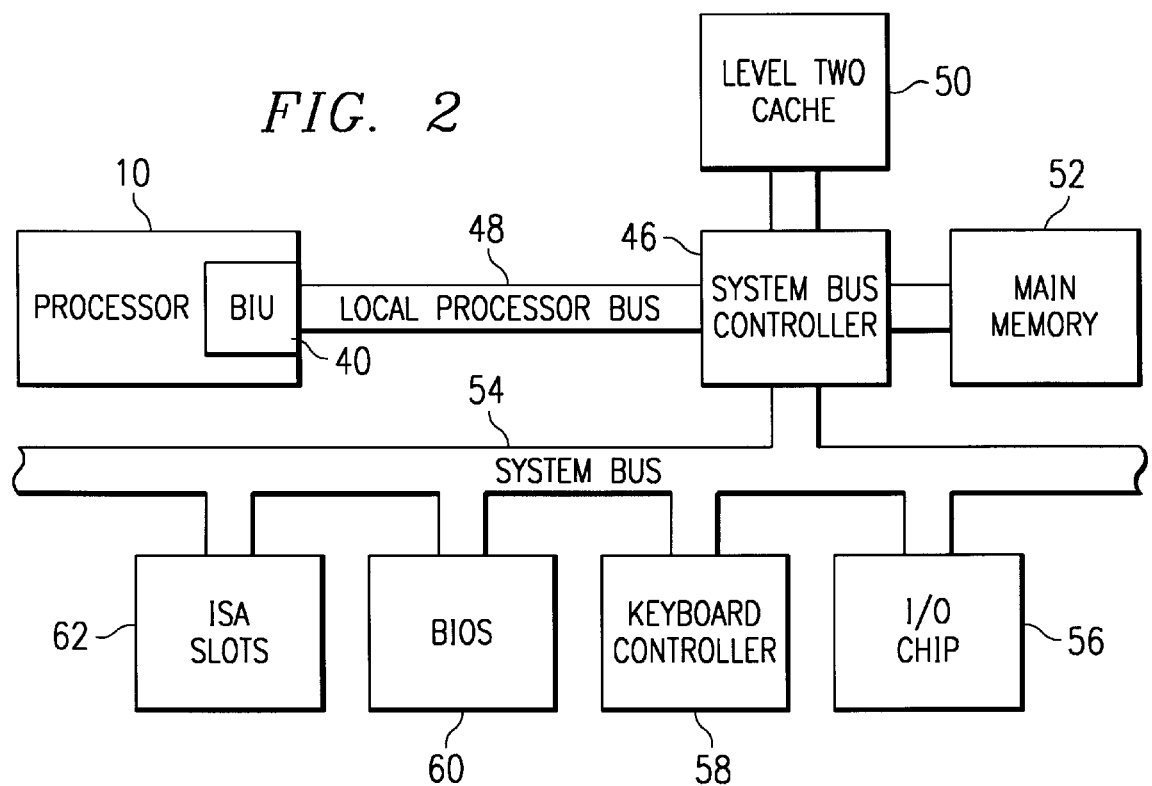
FIG. 2 illustrates an electrical diagram, in block form, of the system in which the microprocessor of FIG. 1 may be incorporated.

FIG. 2 illustrates an exemplary system 44 in which processor 10 may reside. The system 44 includes system bus controller 46. System bus controller 46 is connected to processor 10 through local processor bus 48, which comprises the external address pins, control signals, and data pins of FIG. 1. The system bus controller 46 provides the interface between the processor and the external memory subsystem—level two cache 50 and main memory 52. System bus controller 46 also provides control for the interfaces to the external system bus 54. External system bus 54 is preferably based on the Industry Standard Architecture (ISA), a bus architecture introduced in the International Business Machines (IBM) PC/AT personal computer. The external system bus 54 interfaces to I/O chip 56, keyboard controller 58, basic input/output system (BIOS) 60, and ISA slots 62. Controller 46 may in addition provide control for a VL bus interface, not shown in FIG. 2.

Figure 3:
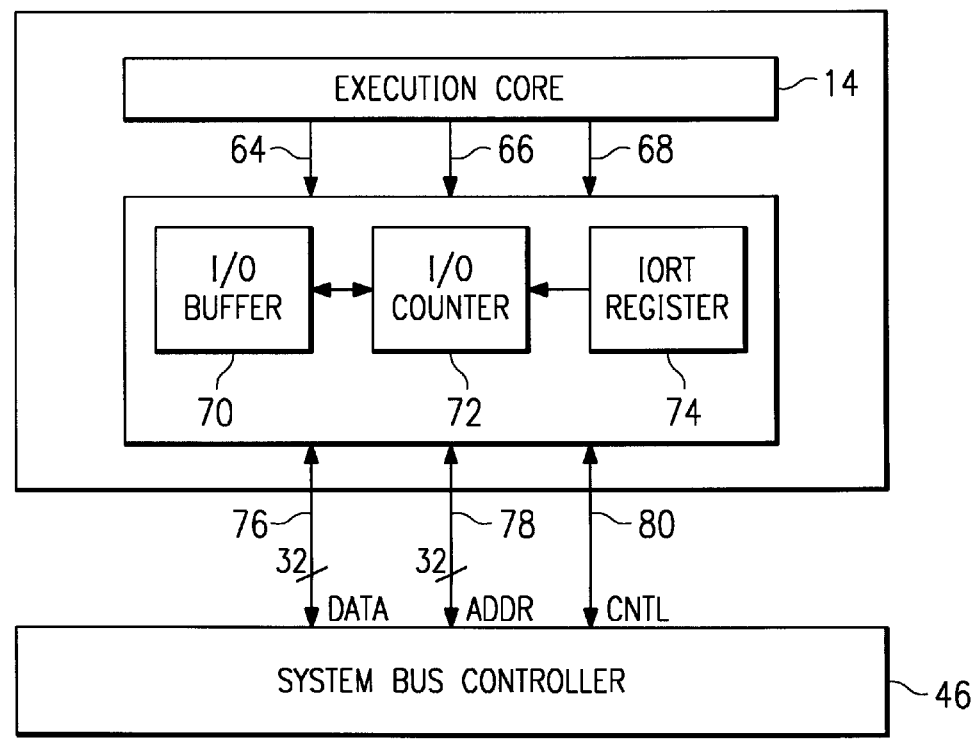
FIG. 3 illustrates in an electrical diagram, in block form, of the bus interface unit of a microprocessor in which the present invention operates and the system bus controller.

FIG. 3 illustrates a block schematic diagram of the BIU 40 and the system bus controller 46, in more detail.

The BIU 40 is connected to the execution core 14 by a 32 bit data line C_DATA 64, 32 bit address line C_ADDR 66 and control lines C_DDATA 68, also shown in FIG. 1. The BIU 40 comprises an I/O cycle buffer 70 and an I/O recovery counter 72, and a control register IORT 74 of the present invention. Of course, a person skilled in the art may appreciate that the present invention may also reside in other components of the system of FIG. 2, such as the system bus controller 46. The BIU 40 is connected to the system bus controller 46 over local processor bus 48 which includes a 32 bit data line 76, a 32 bit address line 78, and control lines 80.

In operation, the execution core 14 communicates bus cycle control information to BIU 40, including whether a bus cycle is an I/O cycle or memory cycle, over control lines C_DDATA 68. The execution core 14 communicates the address and data for the cycle over address line C_ADDR 66 and data line C_DATA 64, respectively. If the bus cycle is an I/O access, the BIU 40 asserts the M/IO# pin on the processor to a logical 0 and asserts address pins A3–A15. The system bus controller 46 returns a READY signal over control lines 80 when the address is latched by the peripheral. When the READY signal is detected by the BIU 40, the I/O recovery counter 72 begins to count. Data is then written to or read from the I/O device depending on whether the I/O bus cycle is a read or a write cycle.

Figure 4:
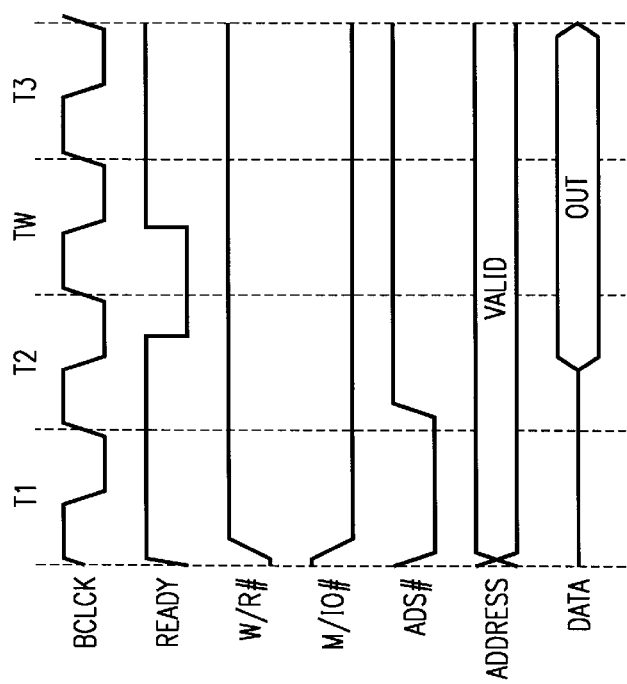
FIG. 4 illustrates a timing diagram of an exemplary I/O write bus cycle performed in the present invention.

The bus timing signals for a typical I/O write bus cycle are shown in FIG. 4. The clock signal BCLCK is the system or bus clock. The BCLCK signal is the timing reference used by the BIU 40. The BIU 40 defines all external timing parameters with respect to the BCLCK rising edge.

During period T1 shown in FIG. 4, the processor activates the bus definition signals, i.e. the M/IO# and W/R# signals, of the I/O bus cycle. The M/IO# is a bus definition signal indicating whether the bus cycle is an I/O cycle or a memory cycle. When high, M/IO# indicates that the current bus cycle is a memory cycle, and when low, indicates that the current bus cycle is an I/O cycle. When high, the W/R# signal indicates that the current memory or I/O bus cycle is a write cycle, or if low, indicates that the current bus cycle is a read cycle. Thus, by asserting the M/IO# pin to a logical low and W/R# pin to a logical high, the processor indicates that the current bus cycle is an I/O write cycle. Also during period T1, the processor asserts the ADS# bus interface signal indicating that a valid port address is on the address bus and asserts the I/O address on address pins A3 through A15. The system bus controller then asserts a READY signal to the processor to indicate that the bus is ready for a bus cycle.

During period T2, the processor drives the data onto data lines D31 through D0 (or if an 64 bit data bus, on data lines D63 through D0). In addition, the system bus controller 46 deactivates the READY signal and thereby generates wait state TW which provides an additional clock period for transmission of data. The system bus controller 46 activates the READY signal during period TW indicating that no more wait states are needed. Thus the bus cycle ends during period T3. Though in this example only one wait state was generated, the system bus controller may insert up to four wait states in this manner by asserting the READY signal to a low.

It is also contemplated that the present invention may perform pipelined bus cycles. Under a pipelined bus cycle, the processor allows up to two outstanding bus cycles at any given time. The address of the first bus cycle is driven on the bus and while the processor waits for the data for the first cycle, the address for a second bus cycle is issued.

When the I/O write bus cycle ends, however, (whether a pipelined or non-pipelined bus cycle) the peripheral may not be able to accept a second I/O bus cycle without loss of data or overrun, despite a number of inserted wait states. Thus, the BIU 40 waits until I/O recovery counter 72 completes its count prior to initiating another I/O bus cycle. However, the BIU 40 may initiate memory bus cycles during the count by the I/O recovery counter 72.

Figure 5:
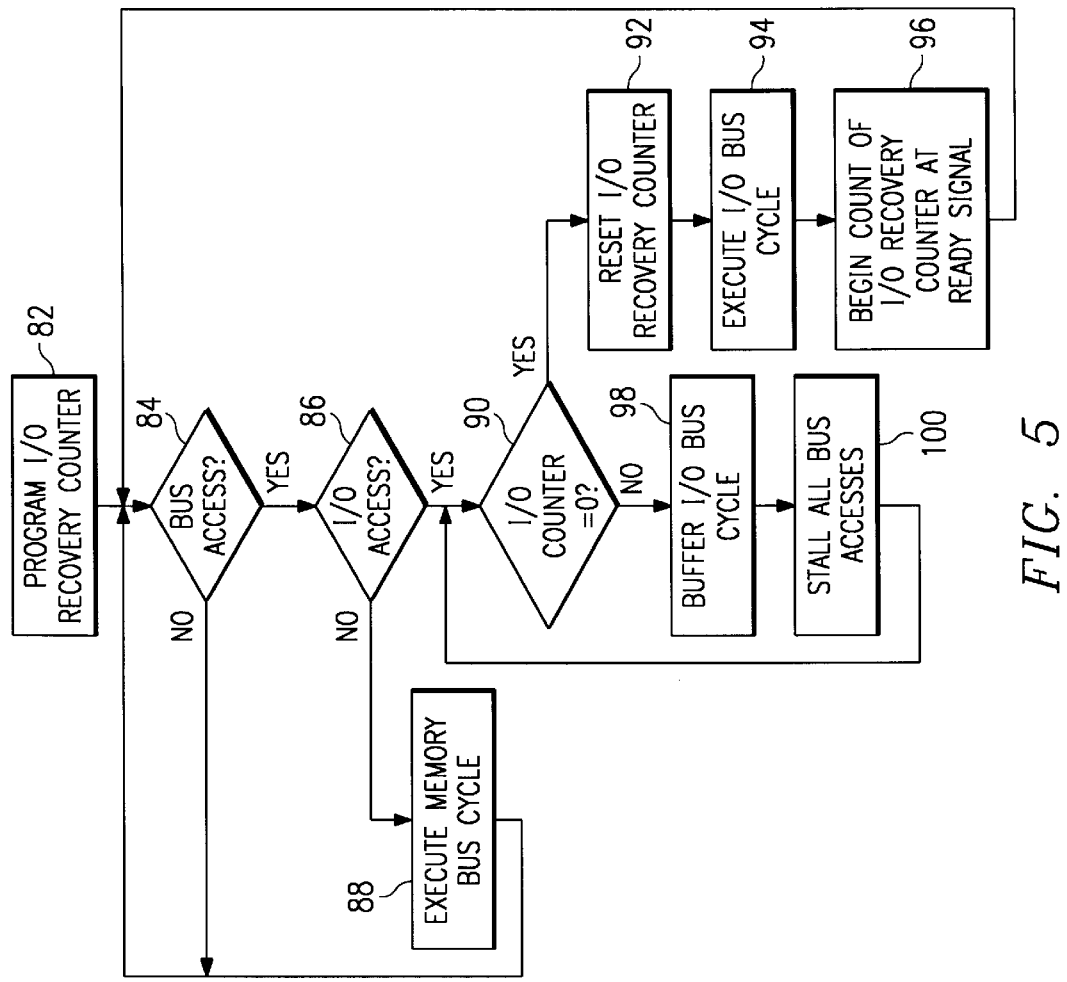
FIG. 5 illustrates a flow chart depicting the steps performed by the present invention.

With reference to the flowchart depicted in FIG. 5, the operation of the I/O recovery counter 72 is discussed in more detail. In the first step depicted in block 82, the I/O recovery counter 72 is programmed with an I/O recovery count number. The I/O recovery count number depends on the ratio of the processor clock speed to the bus clock speed clock and the minimum number of processor clocks between I/O cycles without causing peripheral overrun. Thus, the I/O recovery count number corresponds to the I/O recovery period necessary for the system peripherals. The I/O recovery count number in the preferred embodiment equals the number of bus clocks BCLKs needed to access I/O peripherals without overrun times the ratio of processor clock PCLCK frequency to bus clock BCLCK frequency.

The I/O recovery counter 72 can be programmed with the I/O recovery count number by the BIOS 60 during power-up of the system. The BIOS 60 samples the Clock Multiplier CLKMUL input of the processor to determine the processor's core operating frequency. If CLKMUL equals 0, the processor clock PCLCK frequency is 2 times the frequency of the bus clock BCLCK. If CLKMUL equals 1, the processor clock PCLCK is 3 times the frequency of bus clock BCLCK. Once the BIOS samples the CLKMUL input and determines the processor frequency, the BIOS can then write the specified minimum number of clocks between I/O accesses to the I/O recovery counter based on the contents of a control register IORT 74 in BIU 40.

The control register IORT 74 specifies the minimum number of bus clocks BCLCKs between I/O bus accesses. In the preferred embodiment, control register IORT comprises 8 bits, with bits 0–2 specifying the minimum number of bus clocks between I/O access. Table 1 illustrates the content of register IORT 74 and the corresponding clock delay in the preferred embodiment.

TABLE 1

CONTROL REGISTER IORT DEFINITION

| REGISTER CONTENT | BUS CLOCK DELAY |
| --- | --- |
| 0h | 1 |
| 1h | 2 |
| 2h | 4 |
| 3h | 8 |
| 4h | 16 |
| 5h | 32 |
| 6h | 64 |
| 7h | no delay |

The register content is thus 0 in hexadecimal for a bus clock delay of 1, 1 in hexadecimal for a bus clock delay of 2, 2 in hexadecimal for a bus clock delay of 4, etc. The BIOS multiplies this clock delay by the ratio of processor PCLCK to bus BCLCK clock speed from sampling CLKMUL to obtain the I/O recovery count number.

After the I/O recovery counter 72 is programmed in block 82, the BIU 40 detects whether an external bus access is needed by the processor 10, as depicted in block 84. If no access is needed, the process returns and continues to wait for a bus access. If a bus access is needed, the BIU 40 determines if the bus access is a memory access or an I/O access in block 86. The execution core 14 communicates to BIU 40 when a bus access is a memory or I/O access (When IN or OUT instruction occurs, the bus access is an I/O access). If the bus access is a memory access, the BIU 40 executes the memory bus cycle, as depicted in Block 88.

If the BIU 40 determines in step 86 that the bus access is an I/O access, then the BIU 40 determines if the I/O recovery counter 72 is zero in step 90. If the counter is zero, then the BIU 40 sets the I/O recovery counter 72 to the I/O recovery count number, as depicted in Block 92. In Block 94, the BIU 40 executes the I/O bus cycle by asserting the M/IO# pin to a logical 0 and asserting the address on address pins A3–A15. When the system bus controller 46 returns a READY signal, the I/O recovery counter 72 begins to count, as depicted in block 96. In the preferred embodiment, the I/O recovery counter 72 decrements from the I/O recovery count number at each processor clock PCLCK until the I/O recovery counter 72 reaches zero. A person skilled in the art can appreciate that the I/O recovery counter 72 may also increment from 0 to the I/O recovery count number at each processor clock PCLCK and still obtain the same advantages of the present invention.

After the I/O recovery counter 72 begins to count, the process control returns to block 84 and the BIU 40 monitors for another bus access. If a bus access is needed, and in block 86 the BIU 40 determines the bus access is a memory access, the BIU 40 can execute the memory bus cycle even if the I/O recovery counter 72 has not completed its count. Thus, the memory bus cycles in the present invention can continue without interruption after an I/O bus cycle until the next I/O bus cycle is received, as described below.

If the next bus cycle is an I/O cycle and the I/O recovery counter 72 has reached zero in decision block 90, the BIU 40 resets the I/O recovery counter 72 to the I/O recovery count number and executes the I/O bus cycle. No problem of overrun exists because the I/O recovery counter 72 has completed the count from the previously sent I/O access indicating that the minimum time has elapsed to safely send the next I/O bus cycle.

If, however, the next bus cycle is an I/O cycle and the I/O recovery counter 72 has not reached zero, then the BIU 40 buffers the I/O access cycle in I/O buffer 70, as depicted in block 98. All bus access are stalled at this point, as shown in block 100, because the BIU 40 may not buffer more than one I/O bus cycle. The execution core 14 is signaled to execute no more access cycles until the I/O recovery counter 72 reaches zero and the buffered I/O access is executed.

By stalling the bus cycles until the I/O recovery counter 72 completes its count of the I/O recovery count number, the present invention prevents possible loss of data because of peripheral overrun which may occur when I/O accesses are made to the same peripheral in too short a time. In the preferred embodiment, the BIU 40 stalls the access cycles whether or not the I/O bus cycle is to the same peripheral even though I/O access to different peripherals does not present the same problem of overrun as I/O access to the same peripheral. A person skilled in the art would appreciate that such a step may be added to the above method by adding a comparator circuit which buffers the last I/O access address and compares the buffered address to the next I/O access. The BIU 40 could then execute the next I/O access prior to the I/O recovery counter 72 reaching zero if the I/O access is not addressed to the same peripheral. The preferred embodiment of the present invention does not include this step because of the increased complexity and cost of the hardware. In addition, it is more likely than not that subsequent I/O accesses are to the same peripheral when a processor is executing a set of instructions.

Similarly, in the preferred embodiment, the present invention stalls a subsequent I/O access if the I/O recovery counter is not a logical zero regardless as to whether the subsequent I/O access reads or writes to the peripheral, even though back to back reads to the same peripheral does not present the same problem of overrun as back to back writes to the same peripheral. A person skilled in the art though would appreciate that this step may be added by buffering the control signal from the execution core 14 indicating that the I/O bus cycle is a read or write and comparing the buffered signal to subsequent I/O bus cycles. The BIU 40 may then execute a subsequent I/O cycle, if the subsequent I/O cycle is a read and the previous I/O cycle was a read. Again, the preferred embodiment of the present invention does not include this step because of the increased complexity and cost of the hardware.

Figure 6:
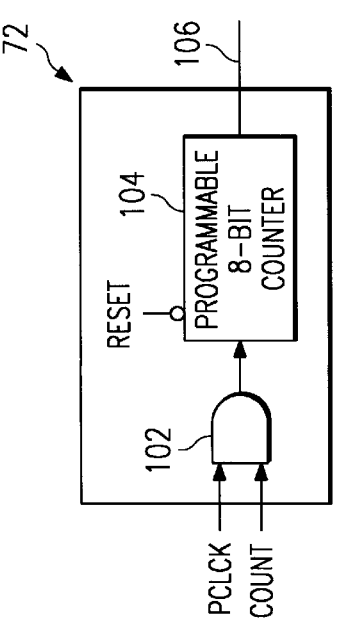
FIG. 6 illustrates an electrical circuit, in block diagram form, of the preferred embodiment of the present invention.

FIG. 6 illustrates an electrical circuit, in block diagram form, of the I/O recovery counter 72. The I/O recovery counter 72 includes an AND gate 102 with inputs of the processor clock PCLCK and a COUNT signal derived from the READY signal sent by the system bus controller 46. The AND gate 102 has an output connected to an 8 bit programmable counter 104. As is well known in the art, the 8 bit programmable counter 104 comprises a reset pin which resets its count. The programmable counter 104 also has an output 106.

In operation, the BIOS 60 programs the programmable counter 104 with the I/O recovery count number. The BIU 40 resets the programmable counter 104 by asserting the RESET pin of the counter 96 at the beginning of an I/O bus cycle. The programmable counter 104 then increments when it receives a logical high signal from the AND gate 102.

The COUNT signal input into the AND gate 102 is generated by the BIU 40. Once the BIU 40 receives a READY signal from the system bus controller during the I/O bus cycle, the BIU 40 asserts the COUNT signal to a logical high. The COUNT signal remains a logical high, even if the READY signal is held low later in the bus cycle (i.e. a wait state is generated). The AND gate 102 thus outputs a logical high at each processor clock PCLCK after the system bus controller returns a READY signal from the I/O bus cycle.

Prior to completing the count of the I/O recovery count number, the output 106 of the programmable counter 104 outputs a not complete signal equal to a logical low. When the programmable counter 104 completes the count of the I/O recovery count number, the outputs 106 outputs a complete signal equal to a logical high. This complete signal indicates to the BIU 40 that another I/O bus cycle may be executed.

In another embodiment of the invention, the clock input to the AND gate 102 may be the bus clock BCLCK rather than the processor clock PCLCK. The I/O recovery count, or I/O recovery period, would just equal the minimum number of bus clocks necessary to prevent I/O overrun. The operation of the I/O recovery counter would otherwise be the same.

Table 2 illustrates an example of the operation of the present invention for several bus cycles. For the purposes of this illustration, the processor clock PCLCK frequency is twice the bus clock BCLCK frequency. Thus, for example, if the bus clock frequency is 50 Mhz, then the processor clock frequency is 100 Mhz. Further, for the purposes of this example, the minimum number of bus clocks BCLCKs between I/O access to prevent overrun equals 8 bus clocks. The register IORT 74 then will be defined as 3h, as seen from Table 1. Thus, the I/O recovery count number equals 16 counts (the minimum number of bus clocks times the multiplier of processor to bus speed ratio).

TABLE 2

ILLUSTRATION OF THE OPERATION OF THE I/O RECOVERY COUNTER FOR SEVERAL BUS CYCLES

| Time | Type of Bus Cycle | I/O recovery counter Counts | Bus Clock BCLCK | Processor Clock (2 × Bus Clock) |
|---|---|---|---|---|
| 0 | I/O | 0 | 0 | 0 |
| 1 | Memory | 16 | 2 | 4 |
| 2 | Memory | 12 | 4 | 8 |
| 3 | I/O (Stall) | 8 | 6 | 12 |
| 4 | (Stall) | 4 | 8 | 16 |
| 5 | I/O | 0 | 10 | 20 |
| 6 | Memory | 16 | 12 | 24 |

At time 0, the BIU 40 executes an I/O access. The I/O recovery counter 72 is reset and begins to decrement at the return of the READY signal from the system bus controller. The bus clock BCLCK is zero and the processor clock PCLCK is zero. At time 1, the BIU 40 executes a memory bus cycle and again at time 2, the BIU 40 executes a second memory bus cycle. At time 3, the processor executes an IN or OUT instruction and signals the BIU 40 to execute an I/O access. However, the I/O recovery counter 72 does not read zero and the output 106 is a non-complete signal. The BIU 40 then buffers the I/O access and stalls any subsequent bus cycles, memory or I/O. Thus no bus cycles are executed at time 3 or time 4. At time 5, the I/O recovery counter reads zero and output 106 is a complete signal. The BIU 40 thus removes the stall of the bus cycles. The BIU 40 executes the buffered I/O bus cycle and resets the I/O recovery counter 72 to the I/O recovery count number equal to 16. At time 6, the BIU 40 continues to execute bus cycles.

The BIU 40 thus performs two memory bus cycles between successive I/O bus cycles without disturbing the order of instruction flow in the processor and without causing peripheral overrun.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. In a computer system having a microprocessor with an execution core, a system bus, and an I/O recovery counter, said I/O recovery counter, comprising:

a clock signal input for receiving a clock input having a frequency corresponding to a clock signal for said execution core;

a count signal input for receiving a count signal indicating an initiation of an I/O bus cycle on said system bus;

a counter for counting to an I/O recovery count number, corresponding to an I/O recovery period, in response to said clock signal input and to said count signal input indicating an initiation of an I/O bus cycle on a system bus, said I/O recovery period equaling a minimum number of bus clocks necessary to prevent overrun of an I/O device times a ratio of a frequency of said clock signal for said execution core to a frequency of a clock for said system bus; and an output indicating that said counter has completed counting said I/O recovery count number.

2. The I/O recovery counter of claim 1, wherein said clock signal input has a frequency corresponding to a clock signal for said system bus.

3. The I/O recovery counter of claim 2, wherein said I/O recovery period equals a minimum number of system bus clocks necessary to prevent overrun of an I/O device.

4. The I/O recovery counter of claim 1, wherein said computer system further comprises BIOS code and said I/O recovery count number is programmable by said BIOS code.

5. A computer system comprising:

a system bus comprising data lines, address lines, and control lines;

a system bus controller connected to said system bus, for controlling transmissions of bus cycles on said system bus and for outputting a READY signal indicating the status of the bus cycles onto the control lines of said system bus;

a microprocessor, comprising:
      an execution core with a clock signal input and a bus definition signal output indicating an I/O bus cycle is needed;
      a bus interface unit, connected to said output of the execution core and to said system bus, for initiating a first I/O bus cycle on said system bus in response to said bus definition signal output of said execution core indicating an I/O bus cycle is needed, and for receiving the READY signal from said system bus controller in response to the initiation of the first I/O bus cycle,
      said bus interface unit includes an I/O recovery counter for counting an I/O recovery period in response to said READY signal from said system bus controller in response to the initiation of the first I/O bus cycle and wherein said bus interface unit initiates a second I/O bus cycle only when said I/O recovery counter completes its count of the I/O recovery period; and, a system clock generator for generating a bus clock signal to said bus interface unit and for generating a processor clock signal to said microprocessor wherein said I/O recovery period equals a minimum number of bus clock periods of said bus clock signal necessary to prevent I/O overrun times the ratio of a frequency of the execution core clock signal to a frequency of the bus clock signal.

6. The computer system of claim 5, wherein said microprocessor further comprises an IORT register for storing the minimum number of bus clock periods of said bus clock signal necessary to prevent I/O overrun.

7. The computer system of claim 5, wherein said clock generator system further comprises a clock multiplier input which indicates a value for the frequency of the processor clock.

8. The computer system of claim 5, wherein said bus interface unit further includes an I/O buffer for storing the second I/O bus cycle until the I/O recovery counter completes its count.

9. In a computer system having a system bus, a clock source, and a microprocessor, said microprocessor including an execution core and a bus interface unit, said bus interface unit, comprising:

I/O initiation means for indicating an initiation of an I/O bus cycle on said system bus;

programmable counting means for counting to an I/O recovery count number in response to said clock source and said I/O initiation means indicating an initiation of an I/O bus cycle on said system bus, said I/O recovery count number corresponding to a minimum number of bus clocks necessary to prevent overrun of an I/O device times a ratio of a frequency of a clock signal for said execution core to a frequency of a clock for said system bus; and output means for outputting a complete signal in response to said counting means completing the I/O recovery count and for outputting a non-complete signal in response to said counting means not completing the I/O recovery count.

10. The bus interface unit of claim 9 further comprising storage means for storing said minimum number of bus clocks necessary to prevent overrun of said I/O device.

11. The bus interface unit of claim 9, further comprising bus cycle means for initiating a first I/O bus cycle on said system bus.

12. The bus interface unit of claim 11, further comprising buffer means for buffering a second I/O bus cycle in response to said output means outputting a non-complete signal.

13. A method of providing an I/O recovery period in a computer system having a system bus, a system bus controller, a processor with a bus interface unit coupled to said system bus, and an I/O recovery counter, said method, comprising the steps of:

programming said I/O recovery counter with an I/O recovery count equaling a minimums number of bus clocks necessary to prevent overrun of an I/O device times a ratio of a frequency of said clock signal for said execution core to a frequency of a clock for said system bus;

initiating a first I/O bus cycle on said system bus by said bus interface unit;

providing a READY signal to said bus interface unit from said system bus controller in response to said initiating step;

in response to said READY signal, initiating said I/O recovery counter to count said I/O recovery count;

determining with said bus interface unit that a second I/O bus cycle is needed and detecting whether said I/O recovery counter has completed its count of said I/O recovery count;

buffering said second I/O bus cycle in response to said I/O recovery counter not completing its count; and initiating said second I/O bus cycle in response to said I/O recovery counter having completed its count.

14. The method of claim 13, further comprising the step of stalling all bus access cycles in response to said buffering step.

15. The method of claim 13, further comprising the step of executing at least one memory access cycle by said bus interface unit after said step of initiating the I/O recovery counter.

* * * * *